Patented Sept. 26, 1944

2,358,774

UNITED STATES PATENT OFFICE 2,358,774

PRODUCTION OF MAHOGANY PETROLEUM SULPHONIC ACIDS

Manuel Blumer, Petrolia, Pa., assignor to L. Sonneborn Sons, Inc., New York, N. Y., a corporation of Delaware No Drawing. Application March 24, 1942,
Serial No. 435,936

5 Claims. (Cl. 260—504)

This invention relates to the production of mahogany petroleum sulphonic acids.

In the solvent refining of petroleum hydrocarbon stocks, these stocks are conventionally treated with a suitable extracting solvent yielding an extract phase predominantly consisting of extracted material and solvent and a raffinate phase predominantly consisting of refined hydrocarbons and solvent. Suitable solvents used in solvent refining procedures, are for instance furfural, dichlorethyl ether, nitrobenzol, aniline, phenol and the like. The raffinate phase may be suitably further treated and such treatment if desired may include an acid refining procedure including the application of sulphuric acid and preferably oleum under sulphonating conditions of acid concentration and temperatures. The extract phase is usually subjected to a solvent recovery procedure leaving a so-called "extract." As this extract defies attempts at refining in accordance with hitherto-known refining practices, the same has been considered as of relatively little value and is as a rule discarded.

I have discovered a procedure by which extracts may be treated to yield valuable mahogany sulphonic acids or their sulphonates and one object of the invention comprises, inter alia, the production of these sulphonic acids or sulphonates from such extracts.

In accordance with the invention a suitable extract is sulphonated in the presence of an organic solvent, substantially freely miscible with such stock and having, relative such stock, a preferential solvency for mahogany sulphonic acids to the substantial exclusion of green sulphonic acids.

The sulphonation in accordance with the invention is preferably carried out by way of sulphuric acid treatment under sulphonating conditions of acid concentration and temperatures, the solvent to be one substantially non-reactable and substantially immiscible with such acid under such conditions. Within the preferred embodiment of my invention, the sulphuric acid treatment may be that conventionally used in ordinary acid refining practices with certain lubricating oil distillates derived from petroleum. Such refining practices include, as a rule, the application of sulphuric acid under sulphonating conditions normally using fuming sulphuric acid. Though the concentration of $SO_3$ in the fuming acid may vary considerably, a 20% fuming acid is employed in the majority of cases. The acid application is regulated in a manner well-known in the art to produce the desired sulphonation reaction, and in general temperatures not exceeding 150° F. are preferred.

When proceeding with the extract sulphonation in accordance with the invention certain petroleum sulphonic acids are formed. These are primarily of two kinds, i. e., the so-called "petroleum mahogany sulphonic acids," usually termed for brevity "mahogany sulphonic acids," remaining dissolved in the oil phase of the treated extract, and the so-called "petroleum green sulphonic acids," usually termed for brevity "green sulphonic acids," predominantly found in the sludge phase of the treated extract and primarily of a water soluble character. After the separation of the oil phase, consisting predominantly of solvent, hydrocarbon material and mahogany sulphonic acids, from the sludge phase, the mahogany sulphonic acids may be recovered from the oil phase preferably in the form of their sulphonates. This recovery is preferably carried out by suitably neutralizing the oil phase, removing the solvent and recovering the sulphonates in accordance with procedures conventional in the art for the recovery of mahogany sulphonates from an oil phase.

Where reference herein is made to the term "extract" or such similar expression in connection with a sulphonation treatment in the presence of a suitable solvent, the same is intended to connote, as is well understood in the art, the solvent extract material derived from the solvent refining of a petroleum hydrocarbon stock.

Within the preferred embodiment of my invention, I may utilize as a solvent an halogenated and preferably chlorinated aliphatic normally liquid hydrocarbon. Suitable solvents of this type are for instance the various chlorinated derivatives of methane, ethane, propane, butane, pentane, etc. Representative of such solvents are for instance, inter alia, methylene dichloride, chloroform, carbon tetrachloride, ethylene dichloride and the like. I find it of advantage to use a solvent which in addition to the characteristics herein specified possesses additionally a vapor pressure and boiling point such that its use involves a minimum of vaporization losses and maximum ease of removal and solvent recovery. A solvent of this preferred type is for instance, amyl chloride.

As to the amount of solvent within the procedure of my invention, there is a direct functional relation between amount of solvent and yield of mahogany sulphonic acids. Such yield increases with increased amounts of solvent. The increase in yield of mahogany sulphonic acids becomes in most cases, substantial at approximately 10% by weight of solvent calculated on the weight of extract under treatment and reaches its maximum at approximately 100% of solvent calculated on such extract. In some cases, however, substantial yield increases are obtained by relatively small amounts of solvent and satisfactory yield increases may thus be obtained with amounts of solvent as low as for instance 1% by weight of the stock. Amounts of solvent in excess of 100% do not seem to further appreciably increase the yield of mahogany sulphonic acids.

When proceeding in accordance with the invention the sulphonation may be conducted by adding the acid in a sequence of shots. Such practice will in many cases further enhance the yield of mahogany sulphonic acids. As a rule I prefer to add the sulphuric acid within the procedure of my invention in such manner that the amount used for each of the successive shots of acid is approximately equivalent to from 5 to 15% and preferably 10% by weight of the extract. Within the preferred practice, the acid sludge is withdrawn after each shot and the oil layers neutralized after a given number of shots depending upon the amount of acid added with each shot. If, for instance, 10% shots are used, it may suffice to neutralize the oil layers after every fourth shot. On the other hand, if larger amounts of acid are used, it may be of advantage to neutralize after a fewer number of shots while when using lesser amounts of acid a greater number of shots may be applied before neutralization becomes advisable.

The following example is furnished by way of illustration of one embodiment of my invention:

*Example*

Equal amounts by weight of carbon tetrachloride and of an extract, obtained in the dichlorethyl ether solvent refining of a Pennsylvania distillate (180 viscosity @ 100° F.) were treated with sixteen (10%) shots of oleum (20% SO₃) at a temperature between 100 and 150° F. The acid sludge was withdrawn after each shot and the oil layers neutralized after every fourth shot. The resulting oil solvent phase was freed from the solvent by distillation and the remaining oil phase was treated to recover mahogany sulphonates therefrom in accordance with procedure well known in the art. The total yield of mahogany sulphonates obtained from the oil layers after the entire cycle was 40.0% by weight of the original extract used.

In a blank the same sequence of operations as exemplified in the preceeding example but without the presence of carbon tetrachloride were carried out. Whereas, in the above example, the sludge layers obtained after each shot of oleum were thin, free-flowing and easily drawn off, the sludge layers in the blank were extremely viscous, required longer periods of settling and were difficult to draw off.

In the case of acid treatment in the absence of a suitable solvent, considerable operational difficulties are present both in sludge separation as well as in the working up of the oil phase and the recovery of mahogany sulphonates under such conditions is unsatisfactory.

Where reference is made herein to "sulphuric acid," such expression is used generically and is intended to include, as it well understood in the art, fuming sulphuric acid or oleum.

The foregoing specific description is for purposes of illustration and not of limitation and it is therefore my intention that the invention be limited only by the following claims or their equivalents wherein I have attempted to claim broadly all inherent novelty.

I claim:

1. Method for the preparation of petroleum mahogany sulphonic acids from extracts derived from the solvent refining of a petroleum hydrocarbon material which comprises sulphonating such extract with fuming sulphuric acid in the presence of a chlorinated aliphatic normally liquid hydrocarbon.

2. Method in accordance with claim 1 in which soid chlorinated aliphatic hydrocarbon is present in amount equal to at least approximately 10% by weight calculated on the weight of said extract.

3. Method in accordance with claim 1 in which said chlorinated aliphatic hydrocarbon is a member of the methane to pentane series and present in amount equal to at least 10% by weight calculated on the weight of the said extract.

4. Method in accordance with claim 1 in which said chlorinated aliphatic hydrocarbon is amyl chloride present in amount equal to at least 10% by weight calculated on the weight of said extract.

5. Method for the preparation of petroleum mahogany sulphonic acid from an extract derived from the solvent refining of a petroleum hydrocarbon material which comprises sulphonating such extract in a multiple number of successive shots with fuming sulphuric acid in the presence of an aliphatic chlorinated normally liquid hydrocarbon of the methane to pentane series in amount equivalent to a least 10% by weight, calculated on the weight of said extract, withdrawing the acid sludge after at least some of said shots, neutralizing the remaining solvent phases after which at least some of the sludge withdrawals and recovering mahogany sulphonates from the neutralized solvent layers, said fuming sulphuric acid being added in successive shots, each equivalent in amount from approximately 5 to 15% by weight of said extract.

MANUEL BLUMER.